United States Patent [19]

Syslak et al.

[11] Patent Number: 5,316,206
[45] Date of Patent: May 31, 1994

[54] METHOD OF JOINING ALUMINIUM MEMBERS

[75] Inventors: Morten Syslak, Haugesund; Edward J. Morley; Leiv Å. Folkedal, both of Kopervik, all of Norway

[73] Assignee: Norsk Hydro a.s., Oslo, Norway

[21] Appl. No.: 884,006

[22] Filed: May 18, 1992

[30] Foreign Application Priority Data

Jun. 14, 1991 [NO] Norway ................................ 912300

[51] Int. Cl.$^5$ ..................... B23K 31/02; B23K 101/14
[52] U.S. Cl. ............................. 228/183; 228/262.51; 29/890.054
[58] Field of Search ............... 228/183, 193, 223, 224, 228/208, 263.17; 29/890.054

[56] References Cited

U.S. PATENT DOCUMENTS

| | | | |
|---|---|---|---|
| 4,615,952 | 10/1986 | Knoll | 228/183 |
| 4,754,913 | 7/1988 | Espedal et al. | 228/183 |
| 4,842,185 | 6/1989 | Kudo et al. | 228/183 |
| 4,891,275 | 1/1990 | Knoll | 428/650 |
| 4,955,525 | 9/1990 | Kudo et al. | 228/183 |

FOREIGN PATENT DOCUMENTS

| | | | |
|---|---|---|---|
| 0263592 | 4/1988 | European Pat. Off. | |
| 56-168958 | 12/1981 | Japan | 228/183 |
| 57-41882 | 3/1982 | Japan | 228/183 |
| 58-171580 | 10/1983 | Japan | 228/223 |
| 61-3662 | 1/1986 | Japan | 228/263.17 |
| 62-25266 | 3/1987 | Japan | |
| 62-156070 | 7/1987 | Japan | |
| 62-161465 | 7/1987 | Japan | |
| 62-252666 | 11/1987 | Japan | |
| 64-31571 | 2/1989 | Japan | 228/183 |

*Primary Examiner*—P. Austin Bradley
*Assistant Examiner*—Jeffrey T. Knapp
*Attorney, Agent, or Firm*—Wenderoth, Lind & Ponack

[57] ABSTRACT

A method of joining Al-members, includes providing at least one member with a thin coating layer of zinc/zinc alloy metal. Interface alloys of Al and Zn are melted and progressively formed from the Al-members with increasing temperature thereof in a brazing furnace.

15 Claims, 3 Drawing Sheets

METHOD OF JOINING ALUMINIUM MEMBERS

BACKGROUND OF THE INVENTION

The present invention relates to a method of joining Al-members, and more particularly to brazing of heat exchange components and to the resulting heat exchangers provided by such method. The method is suitable for production of, e.g., automotive heat exchangers, radiators, condensers, evaporators or other devices.

Brazing of aluminum articles is presently conducted either as flux brazing, applying flux and brazing (sheet) material (AlSi) introduced between the articles, or in vacuum furnaces, using an Al-Si alloy as cladding or coating layer on the surface of the to be joined articles.

A problem experienced with heat exchangers made of aluminum is pitting corrosion. Consequently, zinc coating applied as a thin surface layer, typically up to 5 $\mu$m (35 g/m$^2$) on Al-substrates followed by diffusion heat treatment, has been used in order to improve the corrosion resistance of heat exchangers. Different brazing materials, e.g. AlSi or AlZnSi, are applied on members in the form of coating layers to provide filler material prior to the brazing operation.

The drawback in common with the above brazing methods is the necessity to apply brazing material in amounts which significantly increase the weight and cost of the assemblies, e.g. by using AlSi-clad Al-finstock in heat exchangers, where the thickness of the AlSi layer is typically 10% of the total sheet thickness. During the brazing cycle, Si will diffuse into the core, thus depleting the layer of Si and thus raising the liquidus temperature. This effect complicates the brazing process and requires close temperature control.

Furthermore, the present methods are rather complicated requiring several separate steps, and an inadequate corrosion protection can be experienced with substrates having no zinc treatment prior to the joining step.

SUMMARY OF THE INVENTION

It is therefore an object of the present invention to provide a new and simple method of joining aluminum members requiring no special heavy coating layer of filler metal to form the joints and at the same time resulting in superior corrosion protection of the assembled members.

Another object of the invention is to provide a joining method which can utilize present and existing brazing furnaces and equipment.

Still another object of the invention is to provide heat exchangers of lower weight and at low manufacturing costs while avoiding the necessity of a close temperature control during joining.

These and other objects of the invention are achieved by provision of a new joining method as described below, and the invention is further defined and described in the attached claims.

According to this method aluminum members are joined by providing at least one of the members with an adhering surface layer (coating) of metal material. A flux material is applied to the surfaces of the pre-assembled members. The pre-assembled members are rapidly heated to a predetermined joining temperature and exposed to such elevated temperature for a predetermined period of time and finally cooled to form the solidified joints. The coating material is zinc or zinc alloy. A filler material is formed between the members in situ by diffusion of at least a part of the zinc from the surface layer into the members and melting of interface zinc-aluminium alloys formed with increasing temperature. The initial coating layer preferably has a thickness of from 2 to 20 $\mu$m, most preferred 4 to 6 $\mu$m. The joining temperature is in a range from 382° to 630° C., preferably 500° to 620° C.

BRIEF DESCRIPTION OF THE DRAWINGS

The invention will be described in detail by means of examples thereof and referring to the attached drawings, wherein.

DETAILED DESCRIPTION OF THE INVENTION

The present invention is based on novel and unique utilization of a diffusion process taking place in connection with joining of aluminum or Al-alloy members, hereinafter referred to as aluminum members, conducted in brazing furnaces.

Zinc coating thicknesses of 1 to 2 $\mu$m are normally applied on Al-tubing for corrosion protection of the substrate only and are not in themselves sufficient to provide enough solder (filler) material to provide adequate joints (fillets) by simple melting of the coating layer. In a conventional process of low temperature joining (soldering) a zinc coating layer in excess of 20 $\mu$m, preferably from 30 to 50 $\mu$m, is required in order to ensure sufficient volume of filler material. However, it has surprisingly been found that Al-members coated with thin zinc/zinc alloy layers as thin as 2 $\mu$m and subjected to specific heat treatment according to the present invention will develop at a given joining temperature due to zinc diffusion an interface ZaAl alloy of sufficient volume and composition ensuring in situ formation of a molten filler material resulting in formation of adequate quality joints (fillets) between the joined Al-members.

Figure 1:
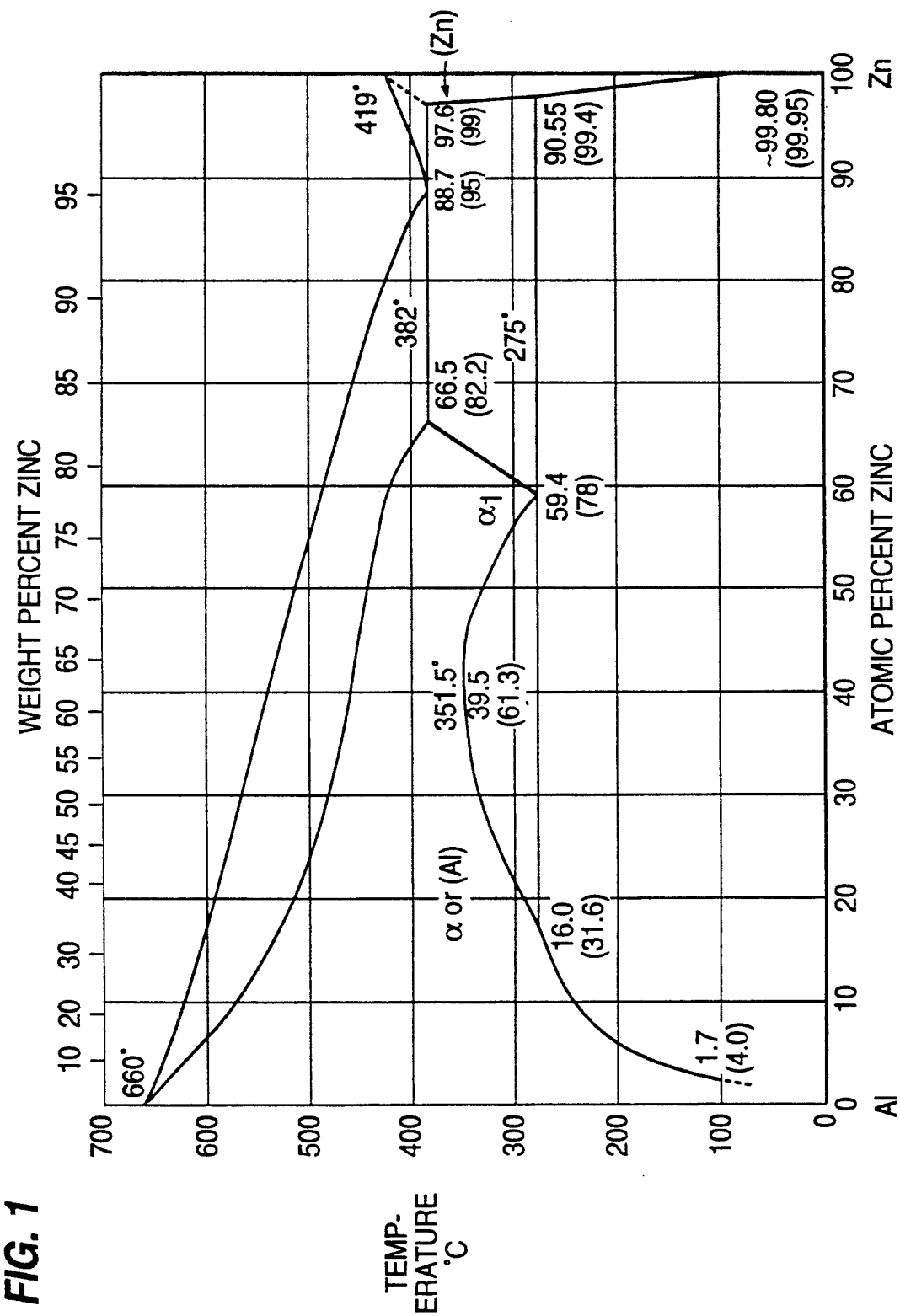
FIG. 1 is a phase diagram of a binary alloy system.

The invention will be explained by way of example referring to FIG. 1 which depicts a phase diagram of the AlZn alloy system where the vertical axis indicates the temperature in ° C. and the horizontal axis percentage of zinc.

During the non-equilibrium conditions that occur during rapid heat-up, the zinc coating is found to form a molten or liquid surface layer at temperatures above its nominal melting point (e.g. at 382° C. in the case of the eutectic Zn5% Al alloy). Thus, at the interface between the Al-substrate and the zinc alloy coating both dissolution of aluminum and diffusion of zinc will take place simultaneously.

This liquid layer will gradually dissolve interface ZnAl alloys being progressively formed at the liquid/solid interface due to the zinc diffusion as the temperature increases, thereby producing a pool of molten filler material having sufficient volume to produce the fillet. At a predetermined specific temperature and under equilibrium conditions, e.g. at a brazing temperature of 600° C., all material containing in excess of about 15 weight % of zinc will lie above the solidus and will, therefore, be liquid or partially liquid and hence will be available for forming fillets.

It has been determined by calculation that a melting zone of about 15 microns will be sufficient to form quality fillets between the tubes and fins in a heat exchanger core having fin spacing of about 3 mm. The minimum initial thickness of the coating layer required to form a desirable thick melting zone (filler metal layer) is temperature and time dependent. Thus, based on the AlZn diagram and Zn5% Al, alloy, the necessary theoretical thickness to provide a sufficient amount of zinc to provide such molten layer varies from 2 $\mu$m at 620° C. to 15 $\mu$m at 382° C.

At lower joining temperatures, in order to provide a sufficient pool of liquid material to produce the fillets, a thicker initial zinc coating is required. In practice it is advisable to increase this theoretical initial thickness by a factor of 1.5-2.0 to ensure formation of sound fillets.

Even if the joining process according to the present invention can be applied over the whole range of temperatures from a typical soldering temperature (below 450° C.) to the brazing temperatures, the greatest potential in terms of material and weight savings is offered while operating at higher joining temperatures (over 500° C.). The actual brazing temperature (lower limit) is determined by the temperature at which the applied flux becomes active and the formed brazing alloy is in the molten state.

EXAMPLE 1

Aluminum tubes were provided with a coating of zinc alloy comprising 5% Al, coating thickness from 2 to 4 $\mu$m, by ultrasonically assisted dipping of the tubes into a molten bath of the zinc alloy. Plain (uncoated) Al-fins and thus provided Al-tubes were then pre-assembled, applying potassium aluminum fluoride flux on the joining surfaces of the members and placed into a brazing furnace in a nitrogen atmosphere. A heat-up rate of from about 30°–150° C./min was applied to bring the assembled Al-members to the brazing temperature. Variable holding times at the brazing temperature followed by accelerated cooling to room temperature were applied as appears from FIG. 2.

Figure 2:
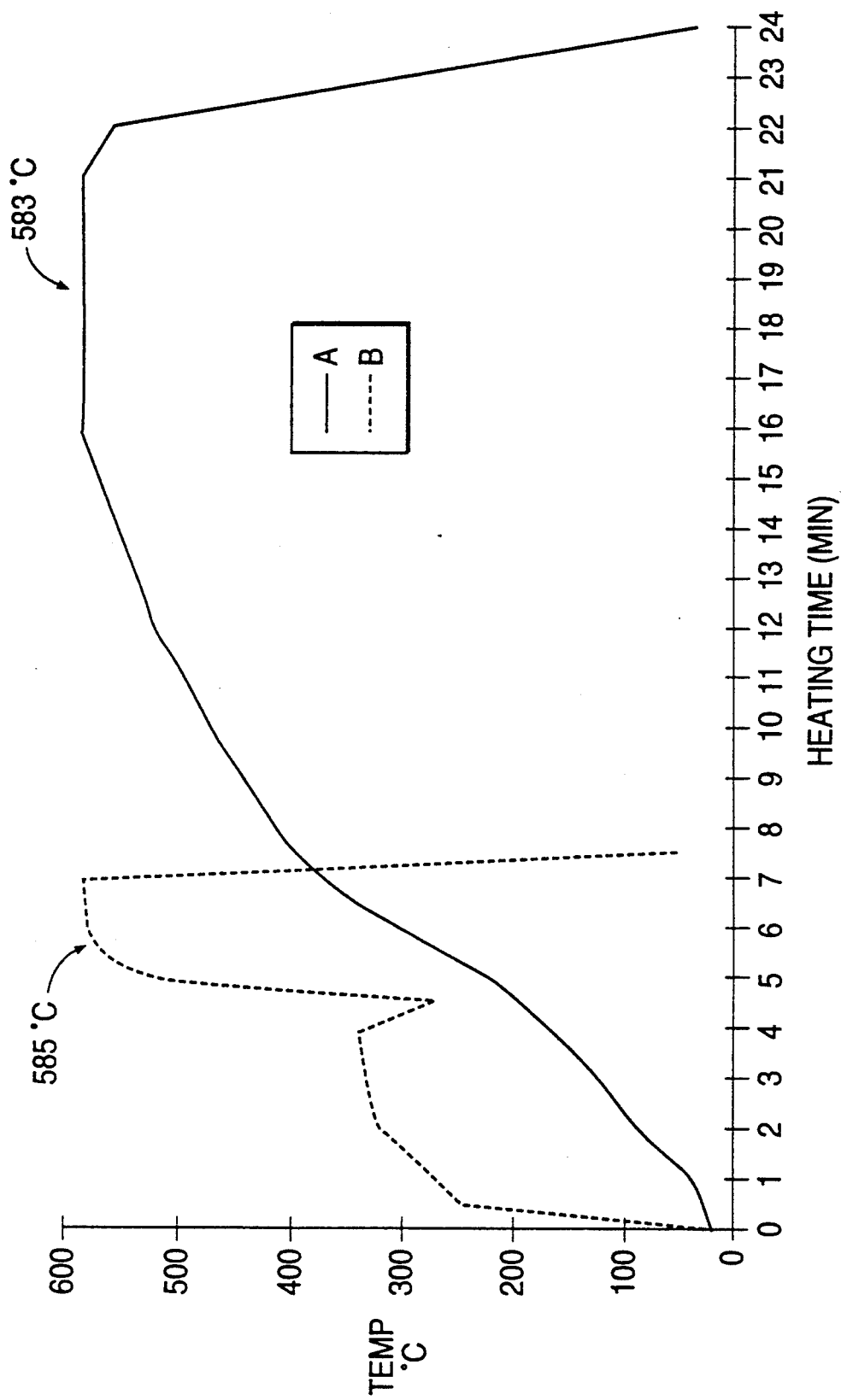
FIG. 2 is a graph illustrating an interdiffusion brazing process characterized by applied temperature heat-up rate and holding time.

FIG. 2 illustrates by means of temperature/time curves the brazing process conducted according to the present invention. Curve A depicts the temperature profile in the furnace for pre-assembled Al-members heated with a heat-up rate of about 36° C./min and a holding time of about 5 minutes at 583° C. Correspondingly, curve B illustrates a heat-up rate of about 117° C./min and a holding time of about 3 minutes at 585° C.

Figure 3:
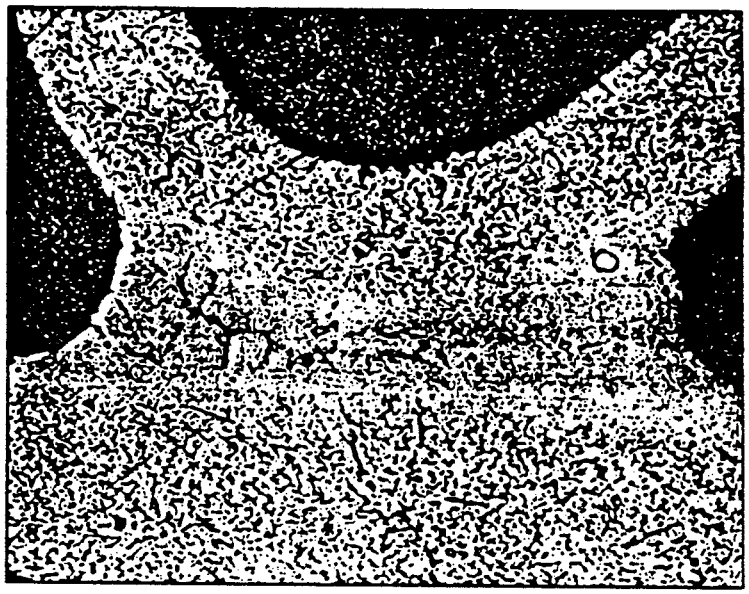
FIGS. 3 and 4 are photomicrographs showing joints between uncoated Al-fins and zinc coated Al-tubes obtained under different thermal treatment cycles as illustrated in FIG. 2.
Figure 4:

The achieved fillets, as shown in FIGS. 3 and 4 (photomicrographs magnification 160×), representing the brazing conditions illustrated by curve A and curve B, respectively, are both of very good quality thus demonstrating the flexibility of the process.

EXAMPLE 2

The brazing conditions of Example 1 were repeated with the exception that the furnace atmosphere was air instead of nitrogen. Sound fillets were created at joining areas through the provision of filler metal by the interdiffusion process even in the absence of inert an atmosphere.

EXAMPLE 3

Aluminum tubes provided with a ZnAl alloy coating according to Example 1, coating thickness 20 $\mu$m, were assembled with plain aluminum finstock. After assembly a flux comprising a mixture of ammonium- and zinc chlorides and sodium fluoride was applied to the joining surfaces. The assembly was rapidly heated in a furnace in a nitrogen atmosphere to 400° C. and held at that temperature for up to 2 minutes followed by cooling in air. Sound joints were provided, mainly by melting of the zinc aluminum alloy coating on the tube.

EXAMPLE 4

Aluminum tubes provided with a ZnAl alloy coating according to Example 1, coating thickness 7.5 $\mu$m, were assembled with plain aluminum finstock. The assembly was provided with a flux, as described in Example 3, at the joining surfaces and rapidly heated in a furnace in a nitrogen atmosphere up to 500° C. and held at that temperature for about 2 minutes followed by cooling in air. Sound joints were formed between the tubes and fins, where part of the fillet volume was provided as a result of diffusion of zinc into the aluminum and subsequent melting of the formed interface AlZn alloys.

EXAMPLE 5

Aluminum tubes were provided with a coating of zinc alloy comprising 5% aluminum, coating thickness in the range of 2 to 4 $\mu$m by a metal spraying technique. These tubes were provided with plain aluminum fins and flux coating according to Example 1 and rapidly heated up to 605° C. in a nitrogen atmosphere followed by soaking for one minute and air cooling. Sound fillets were formed.

EXAMPLE 6

Aluminum tubes were provided with a coating of zinc with thickness about 4 $\mu$m by metal spraying technique. These tubes were assembled with plain aluminum fins and provided with flux according to Example 1. The assembly was heated up to 580° C. during 2 minutes in an atmosphere of nitrogen and with a soaking time of 1 minute followed by air cooling. Sound fillets were formed.

There are several advantages connected to the above joining process and the resulting products. Exchanging AlSi cladding presently used on Al-finstock with zinc-/zinc alloy on the tubes will result in up to a 20% weight reduction of the joined heat exchanger cores. Wear of tooling for forming of finstock will be reduced, effecting further savings in manufacture. A superior corrosion protection simultaneously is achieved in one process only through the diffusion of zinc into the aluminum tube producing a sacrificial layer.

Furthermore, the present process allows use of commerical brazing furnaces and processes and present a high grade of flexibility with regard to optimal brazing parameters, such as brazing temperature and coating thickness. Any appropriate commercially available flux ensuring breaking of oxide layers on the surface of the joined members can be employed. Fluxes comprising halogen components and more specifically fluorides of alkali metals and aluminum are preferred for environmental and corrosion reasons. Fluxes may also constitute part of the actual protective atmosphere in furnaces. The joining process can be performed in different furnace atmospheres avoiding use of expensive inert gas.

The above described invention is not limited to the discussed examples. Other zinc alloys, other metals having lower melting points than the Al-substrate, e.g. Sn instead of zinc, could be employed without departing from the scope of the present invention.

We claim:

1. A method of joining at least two aluminum members by brazing, said method comprising:

providing at least one of said members with an adhering surface layer of zinc or zinc based alloy;

preassembling said at least one member having thereon said adhering surface layer with at least one other said member;

applying flux material to surfaces of said members to be brazed;

subjecting the thus preassembled members to rapid heating to a predetermined elevated brazing temperature within a furnace and therein exposing said members to said elevated brazing temperature for a predetermined period of time, thereby forming a layer of molten filler material in the form of interface zinc aluminum alloys between said members by diffusion of at least part of the material of said surface layer into the material of said members with increasing temperatures; and cooling said members and filler material to thereby form an assembly of said members joined by brazed solidified joints formed by said filler material.

2. A method as claimed in claim 1, wherein said surface layer has a thickness of from 2 to 20 μm.

3. A method as claimed in claim 1, wherein said surface layer has a thickness of from 4 to 6 μm.

4. A method as claimed in claim 1, further comprising maintaining an inert atmosphere within said furnace.

5. A method as claimed in claim 1, further comprising maintaining an atmosphere of air within said furnace.

6. A method as claimed in claim 1, wherein said joining temperature is in a range of from 450° to 630° C.

7. A method as claimed in claim 1, wherein said joining temperature is in a range of from 500° to 620° C.

8. A method as claimed in claim 1, wherein said brazed joints are formed entirely by said formed layer of filler material without the addition of separate brazing filler material.

9. A method as claimed in claim 1, comprising conducting said rapid heating at a rate of 30° to 150° C./min.

10. A method as claimed in claim 1, wherein said members comprise heat exchanger components.

11. A method as claimed in claim 10, wherein said brazing is achieved entirely by said formed layer of filler material of interface zinc aluminum alloys without the addition of separate brazing material.

12. A method as claimed in claim 1, comprising providing said surface layer over an entire surface of said at least one member.

13. A method as claimed in claim 12, wherein said at least one member is a heat exchanger component, and said surface layer is provided on said entire surface sufficiently to provide corrosion protection of said component during use thereof in a heat exchanger.

14. A method as claimed in claim 1, wherein said at least one member comprises a tube having an outer surface, and said providing comprises forming said surface layer over the entire said outer surface.

15. A method as claimed in claim 14, wherein said tube is a heat exchanger component, and said surface layer is formed on said entire surface sufficiently to provide corrosion protection of said tube during use thereof in a heat exchanger.

* * * * *